United States Patent
Yang et al.

(10) Patent No.: US 7,161,325 B2
(45) Date of Patent: Jan. 9, 2007

(54) LEAD-ANGLE CONTROL METHOD AND DEVICE FOR OPERATING PERMANENT MAGNET SYNCHRONOUS MOTOR IN FLUX WEAKENING REGIONS

(75) Inventors: Soon-bae Yang, Seoul (KR); Sung-min Park, Hwaseong-si (KR); Tae-won Kim, Anyang-si (KR); Tae-kyung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/266,385

(22) Filed: Nov. 4, 2005

(65) Prior Publication Data

US 2006/0132074 A1 Jun. 22, 2006

(30) Foreign Application Priority Data

Dec. 20, 2004 (KR) .................. 10-2004-0108945

(51) Int. Cl.
*H02P 21/14* (2006.01)
*H02P 21/00* (2006.01)

(52) U.S. Cl. ............... 318/810; 318/721; 318/701
(58) Field of Classification Search ............. None
See application file for complete search history.

(56) References Cited

U.S. PATENT DOCUMENTS

| | | | | |
|---|---|---|---|---|
| 5,652,495 | A * | 7/1997 | Narazaki et al. | 318/716 |
| 6,008,614 | A * | 12/1999 | Imai | 318/700 |
| 6,163,128 | A * | 12/2000 | Hiti et al. | 318/722 |
| 6,255,798 | B1 * | 7/2001 | Obara et al. | 318/802 |
| 6,707,266 | B1 * | 3/2004 | Nakazawa | 318/432 |
| 6,850,031 | B1 * | 2/2005 | Nakata et al. | 318/801 |
| 6,894,454 | B1 * | 5/2005 | Patel et al. | 318/700 |
| 7,023,168 | B1 * | 4/2006 | Patel et al. | 318/757 |
| 2005/0212471 | A1 * | 9/2005 | Patel et al. | 318/432 |

OTHER PUBLICATIONS

U.S. Appl. No. 11/068,910 to Han et al., filed Mar. 2, 2005.
U.S. Appl. No. 11/074,794 to Han et al., filed Mar. 9, 2005.

* cited by examiner

*Primary Examiner*—Lincoln Donovan
*Assistant Examiner*—Eduardo Colon Santana
(74) *Attorney, Agent, or Firm*—Greenblum & Bernstein, P.L.C.

(57) ABSTRACT

A lead-angle control device according to the present invention includes: a space voltage vector controller calculating effective vector application times necessary for obtaining output voltage vectors of an inverter from stationary-coordinate-system instruction voltage components; a lead-angle compensator comparing the sum of the effective vector application times with a sampling period, and generating lead-angle compensation values; a speed controller generating an instruction current for compensating an error caused by a difference between an instruction speed and a current speed; an instruction current generator which generates a rotating-coordinate-system instruction current component by extracting a lead-angle component at a point where maximum torque-per-ampere can be obtained from the magnitude of the instruction current and performing a mathematical calculation on the magnitude of the instruction current and a lead-angle component; and an instruction voltage generator generating a stationary-coordinate-system instruction voltage component from the rotating-coordinate-system instruction current component.

18 Claims, 5 Drawing Sheets

LEAD-ANGLE CONTROL METHOD AND DEVICE FOR OPERATING PERMANENT MAGNET SYNCHRONOUS MOTOR IN FLUX WEAKENING REGIONS

BACKGROUND OF THE INVENTION

This application claims the priority of Korean Patent Application No. 2004-108945, filed on Dec. 20, 2004, in the Korean Intellectual Property Office, the disclosure of which is incorporated herein in its entirety by reference.

1. Field of the Invention

The present relates to a permanent magnet synchronous motor and, more particularly, to a lead-angle control method and device for speed control in flux weakening regions.

2. Description of Related Art

In recent years, permanent magnet synchronous motors (PMSMs) have been widely used in a variety of industrial applications due to their high efficiency characteristics and high torque characteristics over an inertial force. There is an advantage in that the PMSMs can be controlled at high speeds in a constant power region as well as a constant torque region due to their structural characteristics. Along with the advantage, as the PMSMs are required to be operated at higher speeds than a rated speed in most of industrial application fields employing the PMSMs, there have been proposed various control algorithms intended to increase PMSM operation regions within a fixed output range of an inverter. A flux weakening control algorithm is one of them typically employed as such control algorithms.

In general, as the speed of a motor increases, a counter-electromotive force is also increased. The increased counter-electromotive force partly offsets an input voltage. Consequently, it causes a current applied to the motor to be reduced, which limits the maximum speed of the PMSM. It is a primary principle of flux weakening control to apply negative values to a d-axis current to suppress the increased counter-electromotive force.

Meanwhile, a flux weakening control system is operated along a maximum torque-per-ampere trajectory within output voltage/current limit regions to achieve high efficiency. However, in such a flux weakening control system operated along an optimum trajectory, as shown in FIG. 1, there is a problem in that it is not possible to move from a point A to a point B in the current/voltage limit region, which makes higher-speed operation impossible. To overcome this problem, there has been introduced a new speed control method called a lead-angle compensation method which allows for higher-speed operation in the flux weakening region.

A well-known lead-angle control method in a flux weakening region will now be described with reference to FIG. 2.

According to the well-known lead-angle control method in a flux weakening region, the magnitude of an instruction current $i_s^{e*}$ is first obtained through a speed controller 10, and then rotating-coordinate-system instruction current components $i_{qx}^{e*}, i_{dx}^{e*}$ for producing maximum torque-per-ampere are obtained from the following Equations 1 and 2:

$$i_{qx}^{e*} = sign(i_s^{e*})\sqrt{(i_s^{e*2} - i_{ds}^{e*2})} \quad \text{[Equation 1]}$$

$$i_{dx}^{e*} = \frac{\Phi_f - \sqrt{\Phi_f^2 + 8(L_q - L_d)^2 f_s^{e*2}}}{4(L_q - L_d)} \quad \text{[Equation 2]}$$

The rotating-coordinate-system instruction current components $i_{qx}^{e*}, i_{dx}^{e*}$ obtained from Equations 1 and 2 are applied to a voltage modulator 30 and then converted to rotating-coordinate-system instruction voltage components through two PI controllers. Subsequently, the rotating-coordinate-system instruction voltage components are converted to two-phase stationary-coordinate-system instruction voltage components $V_{ds}^{s*}, V_{qs}^{s*}$ through a coordinate converter and then applied to a space voltage vector controller (SVM). The SVM converts the applied stationary-coordinate-system instruction voltage components according to a space vector pulse width modulation method and outputs it to an inverter 40. A motor starts to be operated by a phase voltage applied by the inverter 40.

Meanwhile, the stationary-coordinate-system instruction voltage components $V_{ds}^{s*}, V_{qs}^{s*}$ outputted from the coordinate converter is fed back to a current modulator 20 and then added to a maximum output limit voltage $$\frac{V_{DC}}{\sqrt{3}}.$$

If the magnitude $\sqrt{(V_{ds}^{e*2} + V_{qs}^{e*2})}$ of the instruction voltage is less than the maximum output limit voltage $$\frac{V_{DC}}{\sqrt{3}},$$

the speed control in the flux weakening region is not necessary. Otherwise, a larger negative d-axis current is necessary to offset a counter-electromotive force.

Accordingly, the above-mentioned prior art lead-angle control method performs a speed control operation in such a manner that when the magnitude $\sqrt{(V_{ds}^{e*2} + V_{qs}^{e*2})}$ of the instruction voltage exceeds the maximum output limit voltage, the counter-electromotive force is suppressed by adding a negative d-axis current $\Delta i_{df}$, which is generated by performing a proportional integral operation on a difference between the magnitude $\sqrt{(V_{ds}^{e*2} + V_{qs}^{e*2})}$ of the instruction voltage and the maximum output limit voltage, to the d-axis instruction current, and a q-axis instruction current is compensated as much as the added amount of the d-axis current.

As apparent from the above description, since the above-mentioned prior art method uses a direct current (DC) link voltage for the lead-angle (speed) control in the flux weakening regions, speed-control performance is dependent on the DC link voltage. As a result, since the DC link voltage usually contains ripple components as shown in FIG. 3, there is a problem in that the speed control may be inaccurate due to erroneous compensation of the d-axis current $\Delta i_{df}$ resulting in a decrease in system stability or reliability.

SUMMARY OF THE INVENTION

The present invention provides a lead-angle control method and device in a permanent magnet synchronous motor (PMSM) control system, which is capable of providing a more accurate high-speed control in flux weakening regions without regard to a DC link voltage.

The present invention further provides a lead-angle control method and device in a PMSM control system, which is capable of providing high-speed control in flux weakening regions by use of a simple configuration.

According to an aspect of the present invention, there is provided a lead-angle control method in a motor control system, the method comprising the steps of: a) calculating and outputting an instruction current $i_s^{e*}$ for compensating a difference between an instruction speed $\omega^*_e$ and a current speed $\omega_e$ by means of a speed controller; b) generating and outputting a rotating-coordinate-system instruction current component $i_{qs}^{e*}, i_{ds}^{e*}$ based on the instruction current $i_s^{e*}$ by means of an instruction current generator; c) generating and outputting a stationary-coordinate-system instruction voltage component $V_{ds}^{s*}, V_{qs}^{s*}$ based on the rotating-coordinate-system instruction current component $i_{qs}^{e*}, i_{ds}^{e*}$ by means of an instruction voltage generator; d) calculating and outputting switching times applied to each switching element of an inverter based on the stationary-coordinate-system instruction voltage component $V_{ds}^{s*}, V_{qs}^{s*}$ by means of a space voltage vector controller; e) calculating and outputting a lead-angle compensation value $\theta^{*\prime\prime}$ by comparing the sum of effective vector application times T1, T2 outputted from the space voltage vector controller with a sampling period $T_s$ by means of a lead-angle compensator; and f) compensating a lead-angle component by adding the lead-angle component $\theta^{*\prime}$ to the lead-angle compensation value $\theta^{*\prime\prime}$.

According to another aspect of the present invention, there is provided a lead-angle control device in a PMSM (permanent magnet synchronous motor) control system, the device comprising: a space voltage vector controller which calculates effective vector application times T1 and T2 necessary for obtaining an output voltage vector of an inverter from a stationary-coordinate-system instruction voltage component $V_{ds}^{s*}, V_{qs}^{s*}$ a lead-angle compensator which compares the sum of the effective vector application times T1 and T2 with a sampling period $T_s$, and generates a lead-angle compensation value $\theta^{*\prime\prime}$ for compensating a lead-angle component $\theta^{*\prime}$ of an instruction current in a flux weakening region according to the comparison result; a speed controller which generates an instruction current $i_s^{e*}$ for compensating an error caused by a difference between an instruction speed $\omega^*_e$ and a current speed $\omega_e$; an instruction current generator which generates a rotating-coordinate-system instruction current component $i_{qs}^{e*}, i_{ds}^{e*}$ by extracting from a ROM table a lead-angle component $\theta^{*\prime}$ at a point where a maximum torque-per-ampere can be obtained from the magnitude of the instruction current $i_s^{e*}$ and performing a mathematical calculation on the magnitude of the instruction current $i_s^{e*}$ and a lead-angle component $\theta^*$ obtained by compensating the extracted lead-angle component with the lead-angle compensation value $\theta^{*\prime\prime}$; and an instruction voltage generator which generates a stationary-coordinate-system instruction voltage component $V_{ds}^{s*}, V_{qs}^{s*}$ from the rotating-coordinate-system instruction current component $i_{qs}^{e*}, i_{ds}^{e*}$.

According to the present invention, since the present invention provides speed control in flux weakening regions by compensating lead-angle components of an instruction current rather than a DC link voltage, it is possible to eliminate an error in speed control which is caused by the DC voltage ripple, thereby improving system performance and reliability.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings. In the following description, a detailed description of well-known functions and configurations incorporated herein will be omitted when it may make the subject matter of the present invention rather unclear.

Figure 4:
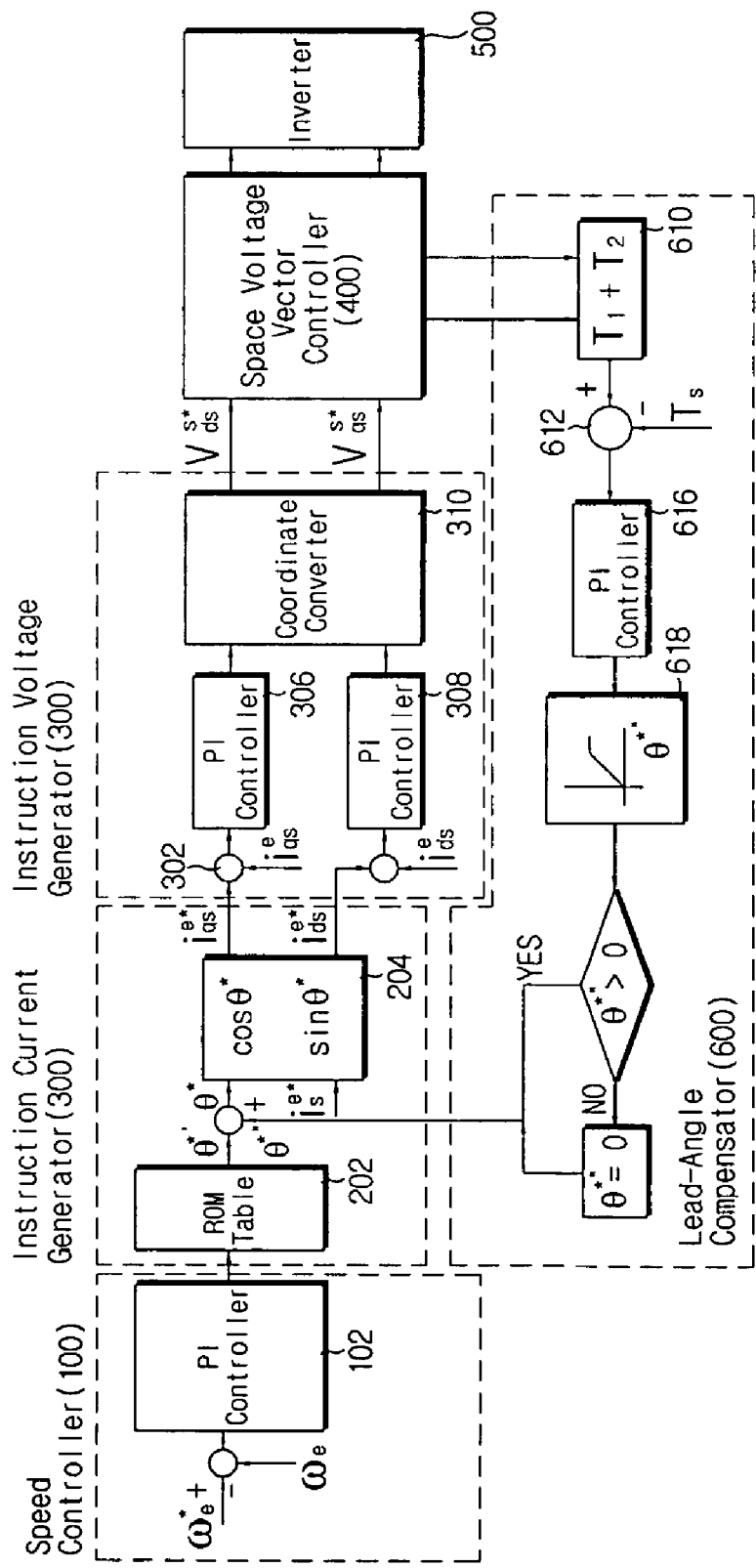
FIG. 4 is a block diagram showing a construction of a lead-angle control device in a motor control system in accordance with an embodiment of the present invention.
Figure 5:
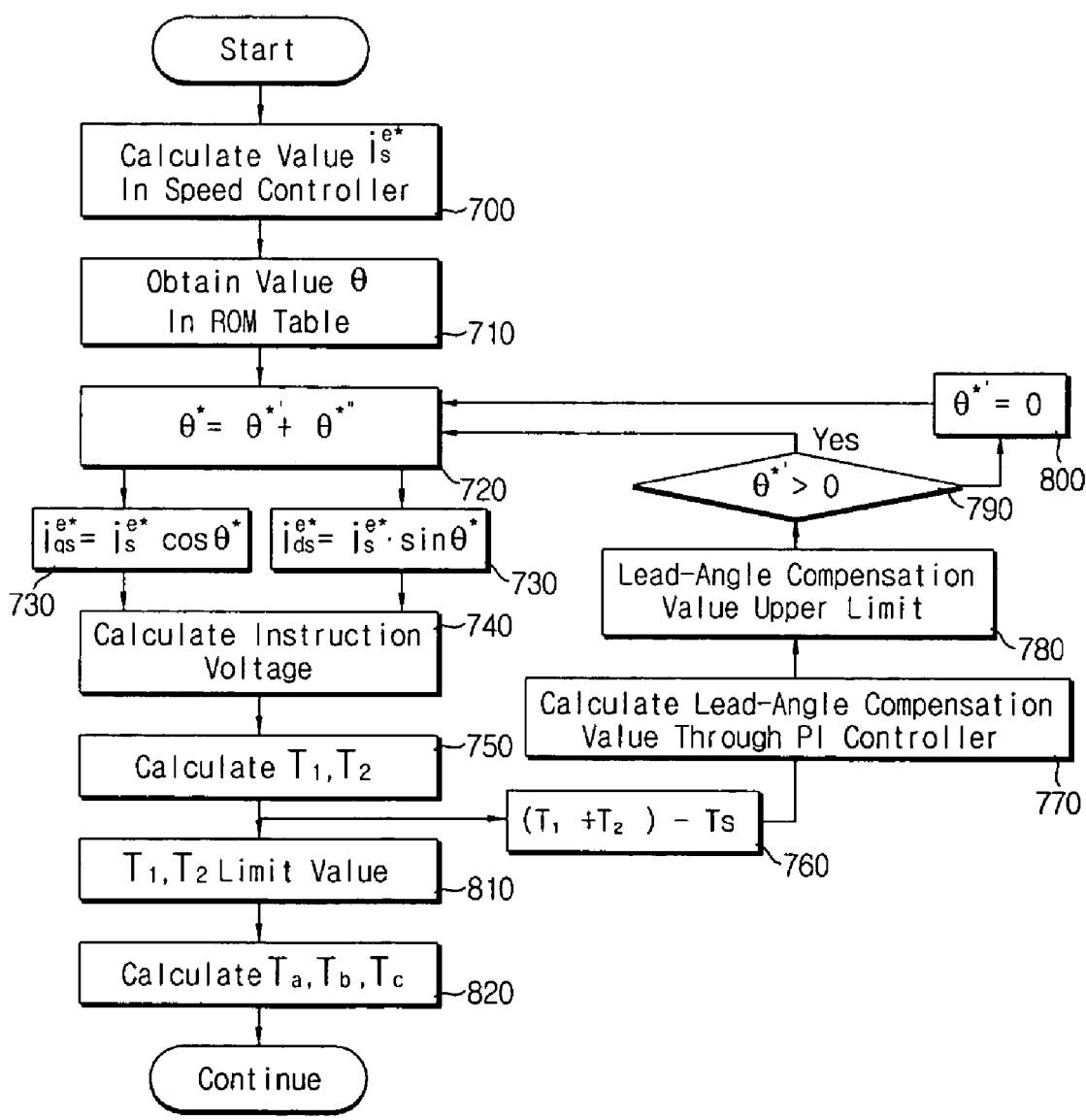
FIG. 5 is a flow chart showing lead-angle control of a motor control system in accordance with an embodiment of the present invention.

FIG. 4 is a block diagram showing a construction of a lead-angle control device in a motor control system in accordance with an embodiment of the present invention. FIG. 5 is a flow chart showing lead-angle control of a motor control system in accordance with an embodiment of the present invention.

As shown in FIG. 4, a lead-angle control device according to the present invention comprises a speed controller 100, an instruction current generator 200, an instruction voltage generator 300, a space voltage vector controller 400, and a lead-angle compensator 600.

Similar to a typical motor control system, the speed controller 100 generates and outputs an instruction current $i^{e*}$ to compensate an error caused by a difference between an instruction speed $\omega^*_e$ and a current speed $\omega_e$ by use of a PI controller 102.

Figure 1:
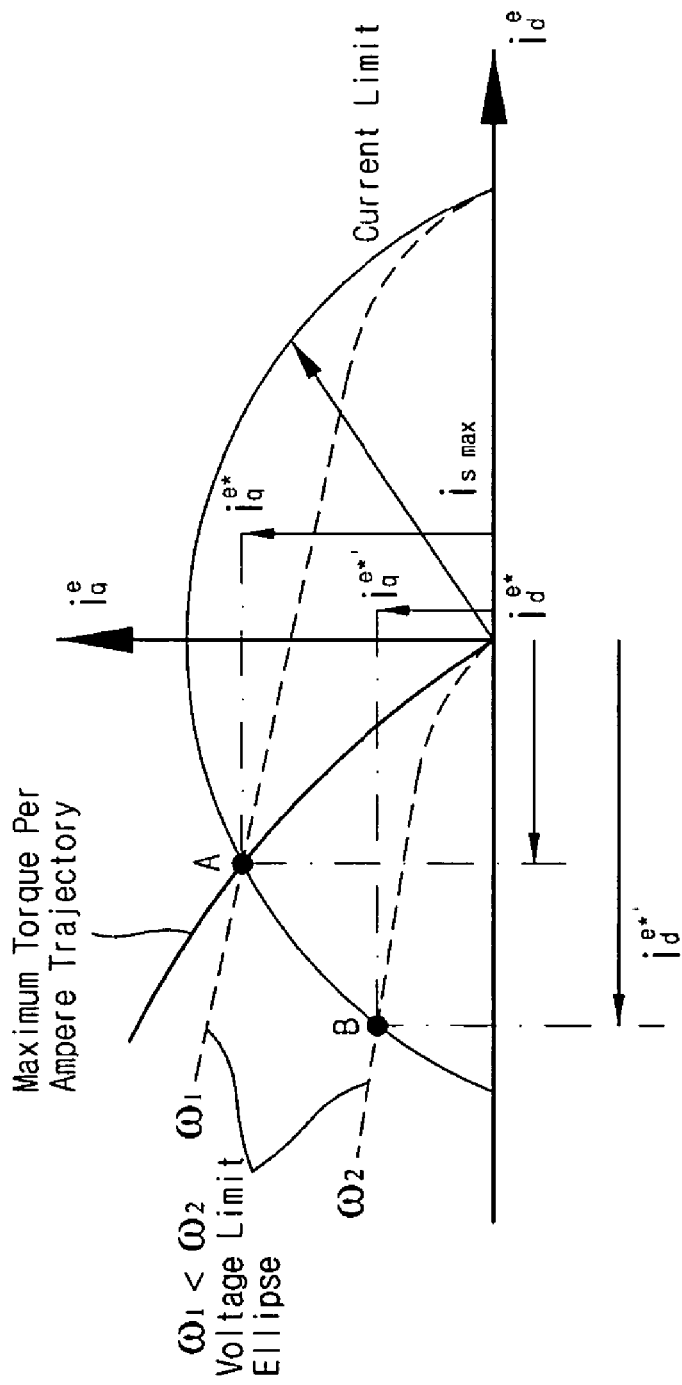
FIG. 1 is a schematic diagram showing a maximum torque-per-ampere trajectory.
Figure 2:
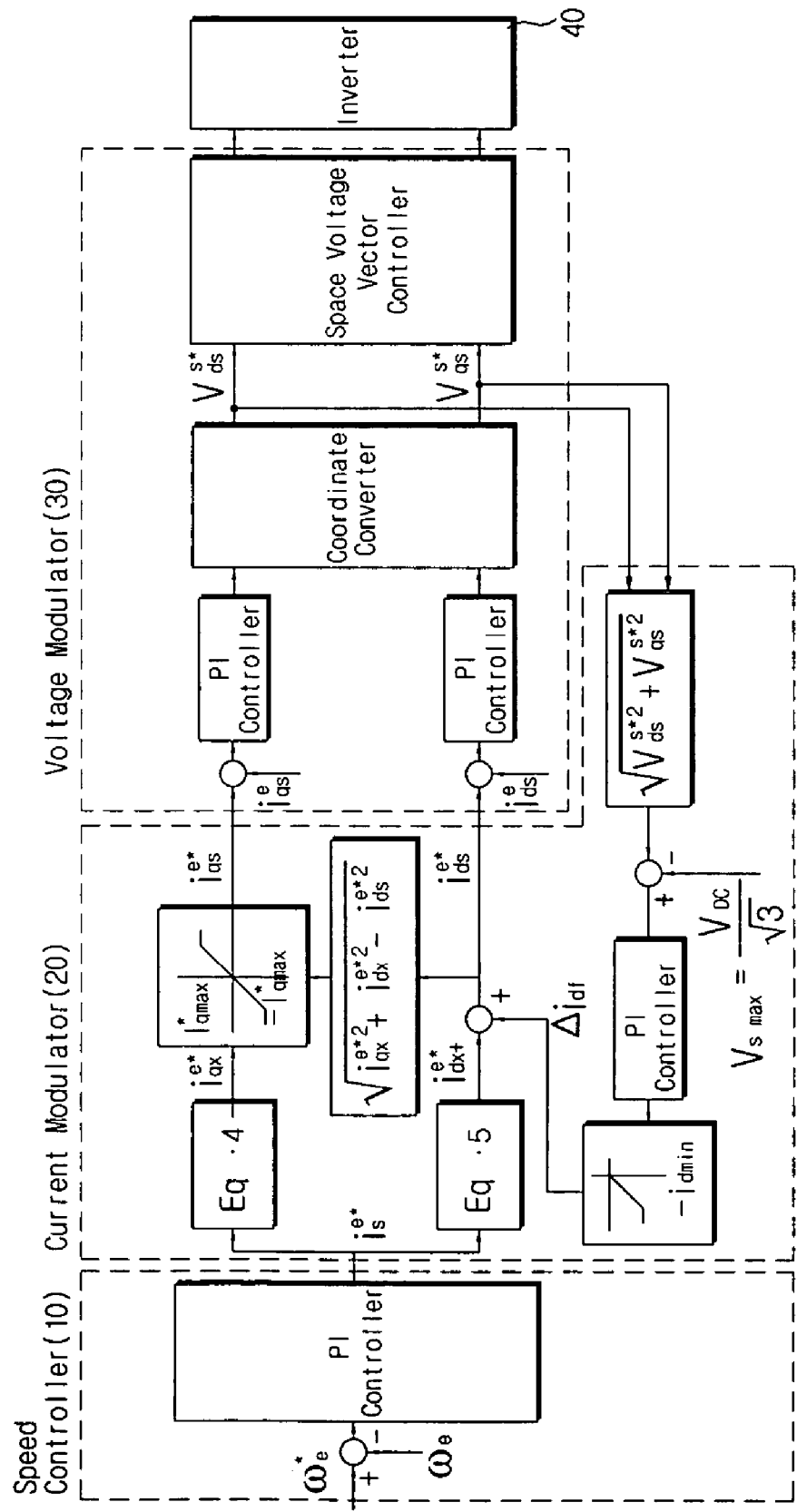
FIG. 2 is a block diagram showing a construction of a motor control system for explaining the prior art lead-angle control method.
Figure 3:
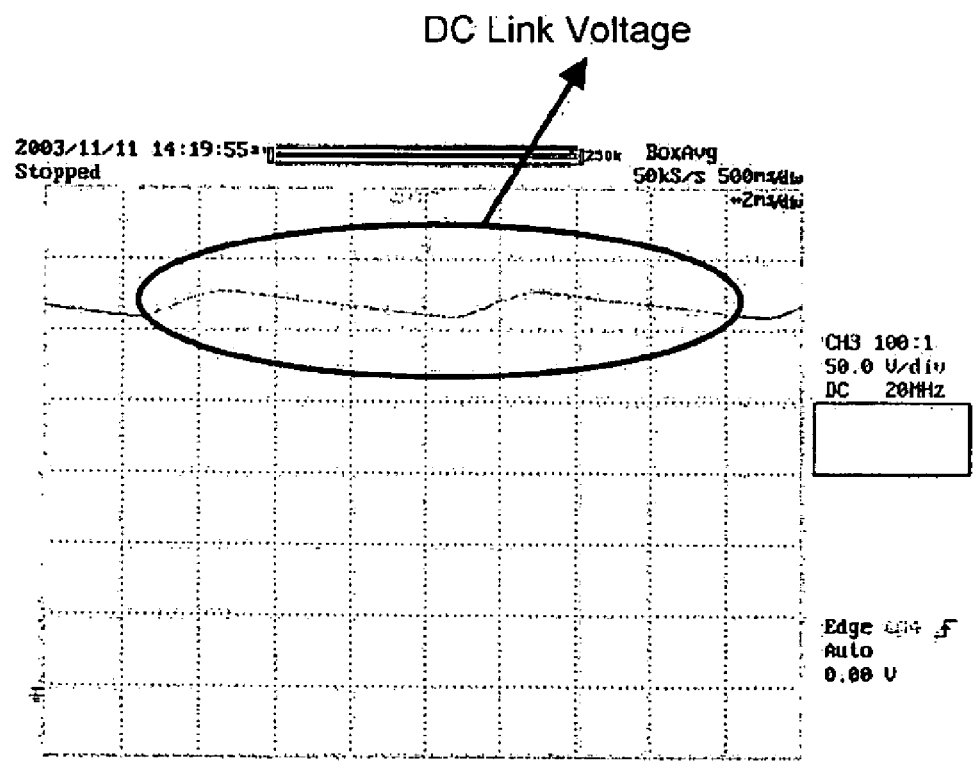
FIG. 3 is a schematic diagram showing DC voltage ripple components.

The instruction current generator 200 located in the following stage of the speed controller 100 extracts from an interior ROM table 202 a lead-angle component $\theta^{*\prime}$ at a point where a maximum torque-per-ampere can be obtained from the magnitude of the instruction current $i_s^{e*}$. The extracted lead-angle component $\theta^{*\prime}$ is compensated with a lead-angle compensation value $\theta^{*\prime\prime}$ applied from the lead-angle compensator 600. Trigonometric function calculations on the compensated lead-angle component $\theta^*$ and the magnitude of the instruction current $i_s^{e*}$ are performed to generate and output rotating-coordinate-system instruction current components $i_{qs}^{e*}, i_{ds}^{e*}$. For reference, the ROM table 202 stores lead-angle components $\theta^{*\prime}$ at points where maximum torque-per-ampere can be generated in the flux weakening region as shown in FIG. 1. At this time, each of the points corresponds to each of the magnitudes of the instruction currents.

The instruction voltage generator 300 generates and outputs the stationary-coordinate-system instruction voltage components $V_{ds}^{s*}, V_{qs}^{s*}$ from the rotating-coordinate-system instruction current components $i_{qs}^{e*}, i_{ds}^{e*}$ outputted from the instruction current generator 200. As well known in the art, the instruction voltage generator 300 comprises adders 302, 304 for obtaining differences between each of the rotatingcoordinate-system instruction current components $i_{qs}^{e*}, i_{ds}^{e*}$, and each of actual rotating-coordinate-system current components $i_{ds}^{e}, i_{ds}^{e}$, PI controllers 306, 308 for performing a proportional integral operation on each of the differences, and a coordinate converter 310 for converting rotating-coordinate-system instruction voltages $V_{qs}^{e*}, V_{ds}^{e*}$ obtained from the PI controllers 306, 308 to the stationary-coordinate-system instruction voltage components $V_{ds}^{s*}, V_{qs}^{s*}$.

The space voltage vector controller 400 located in the following stage of the instruction voltage generator 300 is responsible for calculating effective vector application times T1 and T2 necessary for obtaining output voltage vectors of the inverter 500 from the stationary-coordinate-system instruction voltage components $V_{ds}^{s*}, V_{qs}^{s*}$, and calculating switching times $T_a, T_b, T_c$ to be applied to each switching module of the inverter 500 by a combination of the effective vector application times T1 and T2. The above-mentioned configuration of the space voltage vector controller 400 is a typical one employed in driving the PMSM and a detailed description thereof will thus be omitted herein.

Finally, the lead-angle compensator 600 receives the effective vector application times T1, T2 calculated in the space voltage vector controller 400 at every sampling period $T_s$, and compares a sum of the effective vector application times T1, T2 with the sampling period $T_s$. According to the comparison result, the lead-angel compensator 600 generates and applies lead-angle compensation values θ*‴ for compensating lead-angle components θ*′ of the instruction current in flux weakening regions to the adder in the instruction current generator 200.

The lead-angle compensator 600 comprises an adder 610 for obtaining the sum of the effective vector application times T1, T2, a subtractor 612 for obtaining a difference between the sum (T1+T2) and the sampling period $T_S$, and a PI controller 616 for generating the lead-angle compensation value θ*‴ for compensating the lead-angle component θ*′ of the instruction current in the flux weakening region by performing a proportional integral operation on the difference obtained by the subtractor 612. For reference, it is preferred that when the PI controller 616 outputs values obtained by performing a proportional integral operation on the outputs of the subtractor 612, it performs a gain-control operation so that the values can fall within the range depicted by reference numeral 618. That is, the PI controller 616 preferably performs a gain-control operation so that the lead-angle compensation value θ*‴ falls within an upper limit value and, if the value is negative, the lead-angle compensation value θ*‴ is equal to "0".

Operation of the lead-angle control device thus constructed will now be described with reference to FIG. 5. It should be understood that each component of the lead-angle control device can be coded into a single control module so that it can be implemented with a single lead-angle control algorithm.

Referring to FIG. 5, assuming that the PMSM is being driven, the speed controller 100 calculates and outputs an instruction current $i_s^{e*}$ for compensating an error caused by a difference between an instruction speed $\omega_e^*$ and a current speed $\omega_e$ (step 700). The instruction current $i_s^{e*}$ is applied to the instruction current generator 200, which in turn extracts a lead-angle component θ*′ corresponding to the magnitude of the instruction current $i_s^{e*}$ from the ROM table 202 (step 710). If the sampling period $T_s$ of the space voltage vector controller 400 is greater than the sum of the effective vector application times T1, T2 for obtaining an output voltage vector, the lead-angle compensation value θ*‴ applied from the lead-angle compensator 600 is equal to "0" since flux weakening control is not necessary. Accordingly, the instruction current generator 200 performs trigonometric function calculations on the lead-angle component θ* outputted from the ROM table 202 and the magnitude of the instruction current $i_s^{e*}$ (step 730), generates and outputs rotating-coordinate-system instruction current components $i_{qs}^{e*}, i_{ds}^{e*}$. The rotating-coordinate-system instruction current components $i_{qs}^{e*}, i_{ds}^{e*}$ are converted to stationary-coordinate-system instruction voltage components $V_{ds}^{s*}, V_{ds}^{s*}$ by the instruction voltage generator 300 (step 740). The stationary-coordinate-system instruction voltage components $V^{ds*}$, $V_{qs}^{s*}$ are then applied to the space voltage vector controller 400.

Meanwhile, the space voltage vector controller 400 first calculates the effective vector application times T1, T2 necessary for obtaining an output voltage vector of the inverter 500 from the stationary-coordinate-system instruction voltage components $V_{ds}^{s*}, V_{qs}^{s*}$ (step 750). The space voltage vector controller 400 calculates and outputs switching times $T_a, T_b, T_c$ to be actually applied to each switching module of the inverter 500 by a combination of the effective vector application times T1, T2, whereby the PMSM is rotated at the instruction speed.

If the sum of the effective vector application times T1, T2 calculated in the space voltage vector controller 400 exceeds the sampling period $T_s$, it implies that an instruction voltage is not sufficient to reach the instruction speed since it is offset by a counter-electromotive force. Thus, a negative d-axis current is to be generated to offset the counter-electromotive force. This is done by the lead-angle compensator 600.

That is, the PI controller 616 of the lead-angle compensator 600 performs a proportional integral operation on a difference between the sum of the effective vector application times T1, T2 and the sampling period $T_s$ (step 760) to calculates a lead-angle compensation value θ*‴ for compensating a lead-angle component θ*′ of an instruction current in a flux weakening region (step 770). At this time, the calculated lead-angle compensation value θ*‴ is equal to or greater than "0" and falls within an upper limit (step 780). The lead-angle compensation value θ*‴ is applied to an adder in the instruction current generator 200 and added to the lead-angle component θ*′ corresponding to the magnitude of the instruction current $i_s^{e*}$ (step 720), whereby the lead-angle component θ*′ corresponding to the magnitude of the instruction current $i_s^{e*}$ can be compensated.

That is, if the lead-angle component θ*′ corresponding to the magnitude of the instruction current $i_s^{e*}$, is compensated with the new lead-angle compensation value θ*‴, the negative d-axis current component increases as shown in FIG. 1 while a q-axis current component decreases.

Accordingly, the present invention can provide high-speed control in flux weakening regions without regard to a DC link voltage.

As apparent from the above description, since the present invention provides speed control in flux weakening regions by compensating lead-angle components of an instruction current rather than a DC link voltage, it is possible to eliminate an error in speed control which is caused by the DC voltage ripple, thereby improving system performance and reliability.

In addition, the present invention can obtain rotating-coordinate-system instruction current components by use of a simple configuration compared to the above-mentioned prior art system. Further, the present invention can calculate compensation values for offsetting a counter-electromotive force through a simple equation. Accordingly, the design and construction of a motor control system will be simplified.

While the present invention has been described with reference to exemplary embodiments thereof, it will be understood by those skilled in the art that various changes in form and details may be made therein without departing from the scope of the present invention as defined by the following claims.

What is claimed is:

1. A lead-angle control method in a motor control system, the method comprising:
    calculating and outputting an instruction current to compensate a difference between an instruction speed and a current speed by a speed controller;
    generating and outputting a rotating-coordinate-system instruction current component based on the instruction current by an instruction current generator;
    generating and outputting a stationary-coordinate-system instruction voltage component based on the rotating-coordinate-system instruction current component by an instruction voltage generator;
    calculating and outputting switching times applied to each switching element of an inverter based on the stationary-coordinate-system instruction voltage component by a space voltage vector controller;
    calculating and outputting a lead-angle compensation value by comparing the sum of effective vector application times outputted from the space voltage vector controller with a sampling period by a lead-angle compensator; and
    compensating a lead-angle component by adding the lead-angle component to the lead-angle compensation value.

2. The method of claim 1, wherein the calculating and outputting a lead-angle compensation value comprises:
    calculating a difference between the sum of the effective vector application times outputted from the space voltage vector controller and the sampling period; and
    calculating and outputting a lead-angle compensation value to compensate an instruction current lead-angle component in a flux weakening region by performing a proportional integral operation on the calculated difference.

3. The method of claim 2, wherein the calculating and outputting a lead-angle compensation value comprises performing a gain-control operation so that the lead-angle compensation value can fall within an upper limit.

4. The method of claim 3, wherein the calculating and outputting a lead-angle compensation value comprises performing a gain-control operation so that the lead-angle compensation value having a value of "0" can be outputted if the lead-angle compensation value has negative values.

5. The method of claim 2, wherein the compensating a lead-angle component comprises:
    extracting from a ROM table a lead-angle component corresponding to the magnitude of the instruction current inputted from the speed controller;
    outputting a compensated lead-angle component by adding the extracted lead-angle component to the lead-angle compensation value; and
    generating and outputting a rotating-coordinate-system instruction current component by performing trigonometric function calculations on the compensated lead-angle component and the magnitude of the instruction current.

6. The method of claim 5, wherein the ROM table includes lead-angle components at points where maximum torque-per-ampere can be generated in a flux weakening region, the lead-angle components mapped to correspond to the magnitude of each instruction current.

7. The method of claim 1, wherein the compensating a lead-angle component comprises:
    extracting from a ROM table a lead-angle component corresponding to the magnitude of the instruction current inputted from the speed controller;
    outputting a compensated lead-angle component by adding the extracted lead-angle component to the lead-angle compensation value; and
    generating and outputting a rotating-coordinate-system instruction current component by performing trigonometric function calculations on the compensated lead-angle component and the magnitude of the instruction current.

8. The method of claim 7, wherein the ROM table includes lead-angle components at points where maximum torque-per-ampere can be generated in a flux weakening region, the lead-angle components mapped to correspond to the magnitude of each instruction current.

9. A lead-angle control device in a PMSM (permanent magnet synchronous motor) control system, the device comprising:
    a space voltage vector controller which calculates effective vector application times T1 and T2 necessary to obtain an output voltage vector of an inverter from a stationary-coordinate-system instruction voltage component;
    a lead-angle compensator which compares the sum of the effective vector application times T1 and T2 with a sampling period $T_s$, and generates a lead-angle compensation value to compensate a lead-angle component of an instruction current in a flux weakening region according to the comparison result;
    a speed controller which generates an instruction current to compensate an error caused by a difference between an instruction speed and a current speed;
    an instruction current generator which generates a rotating-coordinate-system instruction current component by extracting from a ROM table a lead-angle component at a point where a maximum torque-per-ampere can be obtained from the magnitude of the instruction current and performing a mathematical calculation on the magnitude of the instruction current and a lead-angle component obtained by compensating the extracted lead-angle component with the lead-angle compensation value; and
    an instruction voltage generator which generates a stationary-coordinate-system instruction voltage component from the rotating-coordinate-system instruction current component.

10. The device of claim 9, wherein the lead-angle compensator comprises:
    a subtractor that obtains a difference between the sum of the effective vector application times T1+T2 and a sampling period $T_s$; and
    a PI (proportional integral) controller that generates a lead-angle compensation value to compensate a lead-angle component of an instruction current in a flux weakening region by performing a proportional integral operation on an error obtained by the subtractor.

11. The device of claim 9, wherein the lead-angle compensator performs a proportional integral operation on outputs of the subtractor and outputs a resultant value, and, if the resultant value is negative, the lead-angle compensator outputs a value of "0.

12. The device of claim 9, wherein the lead-angle compensator performs a proportional integral operation on the outputs of the subtractor and outputs a resultant value which falls within an upper limit.

13. A lead-angle control device in a motor control system, the device comprising:
- a speed controller which calculates and outputs an instruction current to compensate a difference between an instruction speed and a current speed;
- an instruction current generator which generates and outputs a rotating-coordinate-system instruction current component based on the instruction current;
- an instruction voltage generator which generates and outputs a stationary-coordinate-system instruction voltage component based on the rotating-coordinate-system instruction current components;
- a space voltage vector controller which calculates and outputs switching times applied to an inverter based on the stationary-coordinate-system instruction voltage component; and
- a lead-angle compensator which calculates and outputs a lead-angle compensation value by comparing a sum of effective vector application times outputted from the space voltage vector controller with a sampling period;
- wherein a lead-angle component of the instruction current is compensated with the lead-angle compensation value applied from the lead-angle compensator.

14. The device of claim 13, wherein the lead-angle compensator comprises:
- an adder which adds the effective vector application times outputted from the space voltage vector controller;
- a subtractor which obtains a difference between the sum of the effective vector application times and the sampling period; and
- a PI controller which generates and outputs a lead-angle compensation value by performing a proportional integral operation on outputs of the subtractor.

15. The device of claim 14, wherein the PI controller performs a gain-control operation so that the lead-angle compensation value can fall within an upper limit when the PI controller performs a proportional integral operation on the outputs of the subtractor.

16. The device of claim 14, wherein when the PI controller performs a proportional integral operation on the outputs of the subtractor, the PI controller performs a gain-control operation so that the lead-angle compensator outputs a value of "0" if the lead-angle compensation value is negative.

17. The device of claim 13, wherein the instruction current generator comprises:
- a ROM table which stores lead-angle components corresponding to the magnitude of the instruction current inputted from the speed controller; and
- an adder which adds the lead-angle component extracted from the ROM table to the lead-angle compensation value and outputs the compensated lead-angle component.

18. The device of claim 17, wherein the instruction current generator performs trigonometric function calculations on the compensated lead-angle component outputted from the adder and the magnitude of the instruction current to generate and output a rotating-coordinate-system instruction current component.

* * * * *